United States Patent [19]

Banerjee

[11] Patent Number: 5,447,636
[45] Date of Patent: Sep. 5, 1995

[54] METHOD FOR MAKING REINFORCED ION EXCHANGE MEMBRANES

[75] Inventor: Shoibal Banerjee, Newark, Del.

[73] Assignee: E. I. Du Pont de Nemours and Company, Wilmington, Del.

[21] Appl. No.: 168,869

[22] Filed: Dec. 14, 1993

[51] Int. Cl.$^6$ .................. B01D 69/12; B01D 71/32; C08J 5/22; B32B 27/00
[52] U.S. Cl. .................. 210/638; 156/308.6; 156/309.3; 210/490; 210/500.36; 427/244; 427/245; 427/370; 428/421; 428/422; 521/25; 521/27
[58] Field of Search .................. 210/490, 638, 500.36; 427/244, 245, 350, 370; 204/415, 418; 156/308.6, 309.3; 521/25, 27; 428/286, 421, 422

[56] References Cited

U.S. PATENT DOCUMENTS

| 3,304,272 | 2/1967 | Zenftman . | |
|---|---|---|---|
| 3,562,139 | 2/1971 | Leitz | 204/296 |
| 3,884,885 | 5/1975 | Grot . | |
| 4,021,327 | 5/1977 | Grot | 204/296 |
| 4,024,043 | 5/1977 | Dege et al. | 204/296 |
| 4,083,768 | 4/1978 | Lee et al. | 204/296 |
| 4,140,815 | 2/1979 | Dege et al. | 427/340 |
| 4,142,032 | 2/1979 | D'Angelo | 526/43 |
| 4,339,473 | 7/1982 | D'Agostino et al. | 429/254 |
| 4,414,090 | 11/1983 | D'Agostino et al. | 429/254 |
| 4,453,991 | 6/1984 | Grot | 156/94 |
| 4,468,441 | 8/1984 | D'Agostino et al. | 429/254 |
| 4,477,321 | 10/1984 | Bissot et al. | 204/296 |
| 4,518,650 | 5/1985 | Grot et al. | 428/286 |
| 4,528,058 | 7/1985 | Asawa et al. | 156/306.6 |
| 4,552,631 | 11/1985 | Bissot et al. | 204/98 |
| 4,584,071 | 4/1986 | Bissot | 204/98 |
| 4,626,553 | 12/1986 | Hane et al. | 521/27 |
| 4,686,120 | 8/1987 | Johnson | 427/370 |
| 4,731,263 | 3/1988 | Martin et al. | 427/244 |
| 4,954,388 | 9/1990 | Mallouk et al. | 428/198 |

FOREIGN PATENT DOCUMENTS

| 62-280230 | 12/1987 | Japan . |
| 62-280231 | 12/1987 | Japan . |
| 1286859 | 8/1972 | United Kingdom . |

*Primary Examiner*—John Kim

[57] ABSTRACT

A method for making a composite fluorinated ion exchange membrane is provided comprising applying a continuous fluorinated ion exchange polymer film to a porous reinforcing substrate, preferably made from a polyolefin such as linear high density polyethylene. The composite membrane is made by applying a solvent to the surface of the film and/or the substrate and then affixing the reinforcing substrate. These reinforced membranes may advantageously be used as separators in fuel cells, and as selective barriers in permeation separation and facilitated transport operations.

19 Claims, No Drawings

METHOD FOR MAKING REINFORCED ION EXCHANGE MEMBRANES

FIELD OF THE INVENTION

The invention relates to a method for making an non-porous composite fluorinated ion exchange membrane which is particularly useful in fuel cells, electrolytic cells and other chemical separations. The method comprises the lamination of a fluorinated ion exchange film to a porous substrate made from a hydrocarbon, preferably a polyolefin, such as polyethylene.

BACKGROUND OF THE INVENTION

In electrochemical cells such as electrolytic cells or fuel cells, it is important to provide a separator between the anode and cathode compartments. Chemically stable ion exchange membranes made from perfluorosulfonic acid polymer, as described in U.S. Pat. Nos. 3,282,875; 3,718,627; 4,358,545; and 4,329,434, or from perfluorocarboxylic acid polymer, as described in U.S. Pat. Nos. 4,131,740 and 4,734,170, have found broad use as separators, particularly for the electrolysis of brine.

For reasons of quality, efficiency, cost effectiveness and often safety it is important that the separator in an electrolytic cell be tear, abrasion, puncture and scratch resistant, yet not so thick or reinforced that its resistance to ionic conduction is excessively high, in which case the corresponding power requirements of an electrolytic cell are excessively high.

Fluorinated ion exchange membranes are also well known in the field of fuel cells. Such ion exchange membranes have good chemical and thermal resistance and have been used in fuel cells, such as methanol-air fuel cells and hydrogen-oxygen fuel cells. In a fuel cell system, a problem arises which is similar to the problem in an electrolytic cell: reduced electrical energy efficiency arises due to ohmic loss by electrical resistance of the membrane in which case the corresponding power output of the fuel cell is excessively low.

In order to reduce the membrane resistance, it is desirable to decrease the thickness of the membrane and increase the water content. However, a decrease in thickness and an increase of the water content may reduce the electrical resistance, but brings about an abrupt deterioration of the membrane strength.

The mechanical strength of membranes used in an electrolytic cell is important. It is also important in a fuel cell, especially a gaseous fuel cell. Many fuel cells operate at high differential pressure which increases the likelihood of damage to the fragile membrane. Such differential pressure may be subject to fluctuation which also increases the liklihood of damage to the membrane. In addition, fuel cells, especially fuel cells used in motor vehicles or similar applications, are frequently shut down and restarted; such cycling causes the membrane to dehydrate and rehydrate which causes stress and further increases the likelihood of damage to the membrane.

Prior art fluorinated membranes can be in the form of a reinforced or unreinforced film or laminar structure. Use of reinforcement within a membrane, while making it stronger, is not totally beneficial. As noted above, one deleterious effect is that use of reinforcement such as fabric results in a thicker membrane, which in turn leads to higher electrical resistance. A second deleterious effect, which also leads to higher resistance, is caused by a "shadowing" effect of the reinforcing members. The shortest path for an ion through a membrane is a straight perpendicular path from one surface to the other surface. Reinforcement members are usually fabricated of substance which is not ion-permeable. Those parts of a membrane where an ion cannot travel perpendicularly straight through the membrane, and from which the ion must take a circuitous path around a reinforcing member, are termed "shadowed areas." Introduction of shadowed areas into a membrane by use of reinforcement leads to a reduction in the portion of the membrane which actively transports ions, and thus increases the resistance of the membrane. A third deleterious effect of the use of reinforcement within a membrane is poor water management. Particularly, water is being generated in the cathode side of the fuel cell and diffuses through the membrane from the cathode side to the anode side. With a thick membrane having reinforcement, the water diffusion is slow and one side of the membrane dries out, resulting in increased membrane resistance.

Reinforcement mechanisms have been devised in which a fabric, usually made from polytetrafluoroethylene (PTFE) fibers or expanded polytetrafluoroethylene (EPTFE) fibers, has been partially or wholly encapsulated by or embedded in the perfluoro ion exchange polymer. Commercial products reflect this approach. Such reinforced membranes are described in U.S. Pat. No. 4,604, 170; and Japanese Patent Applications No. 62-280231 and 62-280230. However, it requires about a 5-10 mil thickness of ion exchange membrane to effectively bond to and encapsulate the fabric. Thinner membranes are unsatisfactory because they may not completely cover the fabric on both sides and the integrity of the membrane is impaired. The electrical resistance in aqueous media of this reinforced 5-10 mil structure is considerably higher than that of an unreinforced thinner membrane because of the increased thickness and the reduced effective cross section available for ion transport because of the encapsulated fabric. With such a membrane, the resistance is high and such a membrane is not necessarily satisfactory for use in electrolytic cell or fuel cells.

More significantly, PTFE, EPTFE or similar reinforcements are too expensive and are difficult to process. For example, ion exchange membranes reinforced with PTFE or EPTFE may be formed by laminating at an elevated temperature the PTFE/EPTFE to a precursor perfluorinated ion exchange film.

The precursor perfluorinated ion exchange polymer is extruded at a temperature less than 300° C. to form a film. As noted above, this film can be perfluorinated sulfonyl fluoride polymer, perfluorinated carboxylester polymer, or a multilayered structure of such sulfonyl fluoride polymers, carboxylester polymers or both, where the different polymers form distinct layers in the coextruded film.

Lamination of the film (single or multilayer) to the PTFE/EPTFE, takes place with surface temperatures of about 270° C.–280° C. and under a pressure differential of not more than about 760 mm mercury. This lamination step is difficult to control and may result in poor reproducibility and poor uniformity. In addition, the process used to make membranes reinforced with materials such as PTFE or EPTFE disadvantageously requires at least one costly heat lamination step. In addition, the fluorinated membrane may be damaged during such high temperature processing.

Reinforced ion exchange membranes are also useful in chemical separations and facilitated transport mechanisms. In the separation of fluids, membranes through which fluids have different permeation rates have been useful in separating mixtures of those fluids. Such membranes have been wound with macroporous separating meshes which permit free flow of fluids to and from the membrane's surfaces and modules have been constructed. Thin perfluoroionomer films have a very high permeability to water and some other polar molecules, but effective permeation separation modules cannot be built from these thin, fragile perfluoroionomer films.

Facilitated transport is a related separation technique wherein a continuous membrane is plasticized or swollen with a liquid. The dissolved liquid complexes with one of the fluids, such as gases, to be separated and selectively facilitates its transport across the membrane. Again, thin perfluoroionomer films offer some unique opportunities for facilitated transport, as, for example, in the separation of amino acids in aqueous media, but the thin perfluoroionomer does not have sufficient dimensional stability or mechanical strength to undergo module construction or withstand operating pressure differentials. U.S. Pat. No. 4,194,041 provides for a waterproof article which is composited with a hydrophobic EPTFE layer and permits the passage of water vapor. The ability to transport aqueous liquids is important not only in electrolytic processes but also in permeation separation and facilitated transport operations.

The disadvantages of membranes reinforced with PTFE, EPTFE or the like may be overcome by using a membrane reinforced with other porous substrates, such as porous substrates made from hydrocarbons, such as polyolefin, especially polyethylenes, polyesters or polycarbonates, preferably made from linear high density polyethylene ("LHDPE"). Such substrates or fabrics provide a relatively inexpensive membrane with good mechanical strength capable of operation at low electrical resistance with good water management. However, such substrates usually cannot be processed at the high temperatures used to process PTFE/EPTFE reinforcement and the accompanying precursor polymer film. Such substrates may be thermally unstable and may, for example, degrade, decompose or melt at temperatures of 260° C. LHPDE, for example, will melt and lose porosity, and possibly degrade, at temperatures of about 130° C.

Therefore, a method is needed to produce a substantially non-porous, composite ion exchange membrane which is reinforced with porous LHDPE or the like and may advantageously be processed at room temperature or low temperatures to prevent the substrate from degrading or melting.

The present invention provides a simple, inexpensive, reproducible process of making a reinforced substantially non-porous membrane with satisfactory mechanical strength and very low resistance to ionic conduction which approaches that of very thin, unreinforced perfluoro ion exchange polymer membranes. The process eliminates the need for a costly heat lamination step and provides an alternate method for making membranes when high temperature lamination will melt, degrade or decompose on the components. The process of the present invention provides composite membranes which overcome the mechanical strength limitations of thin perfluoroionomer films without significantly reducing the high permeation and transport rates possible with these thin perfluoroionomer films. Such reinforced ion exchange membranes are particularly useful in fuel cells.

SUMMARY OF THE INVENTION

A process of making a composite fluorinated ion exchange membrane is provided. The process provides a composite membrane comprising a fluorinated ion exchange polymer film bonded to a substantially porous hydrocarbon substrate. The composite membrane is substantially non-porous to bulk flow of fluids but permits ions, especially cations, to transport across the composite structure.

The porous substrate used in the present invention is made from a hydrocarbon, preferably having a melting point below about 220° C., such as polyolefin, preferably LHDPE. The substrate may be a fabric, may be woven or nonwoven. The bond between the substrate and fluorinated ion exchange polymer film is formed by applying a solvent to a surface of the film and then applying the substrate. The fluorinated ion exchange polymer film preferably is perfluorosulfonate or perfluorocarboxylate. The fluorinated ion exchange polymer is solubilized by coating a surface of the membrane with a solvent. The use of certain solvents advantageously enables the membrane to be processed at or near room temperature. A sufficient amount of solvent should preferably be used so as to permit the solubilized fluorinated ion exchange polymer layer to flow into the pores of the substrate so as to facilitate adhesion between the porous substrate and the ion exchange film. In addition, the solvent preferably contains dissolved or suspended fluorinated ion exchange polymer.

The composite membrane made by the present method may be used as a reinforced thin selective barrier in chemical separations, providing mechanical strength without sacrificing low resistance to selective transport inherent in a thin perfluoro ion exchange polymer film alone. The composite membrane may be employed as an electrolytic separator between anode and cathode compartments in an electrochemical cell, especially a fuel cell, providing high voltage operation. The membrane may also be used as a thin continuous barrier in permeation separations and in facilitated transport operations, whereby the fabric provides mechanical support and the spaces between woven fibers provide avenues of passage of fluids to and from the membrane's surfaces without substantially sacrificing the high selective permeation rates to water and other hydrophilic materials inherent in the thin perfluoro ion exchange polymer film.

DETAILED DESCRIPTION OF THE INVENTION

A method for making a mechanically strong composite fluoropolymer membrane with low resistance to ionic conduction in electrolytic processes and allowing high permeation rates in permeation separation and facilitated transport operations is provided. The membrane comprises a substantially nonporous fluorinated ion exchange polymer film attached on one or both sides to a substantially porous reinforcing substrate. One or both sides of the polymer film may be bonded to a substrate.

The porous substrate layer of the present invention is made from a hydrocarbon, preferably a polyolefin, preferably having a melting point below about 220° C. The polyolefins particularly useful in making the membranes include polyethylene, polypropylene, polybutylene, copolymers of those materials, and the like. Polyethylene is preferred and may be high, medium or low density. The substrate may be a fabric which is woven or non-woven and (a) provides mechanical anchoring sites whereby the ion exchange membrane may be firmly bonded; (b) provides a support preventing the relatively thin ion exchange membrane from being ruptured or damaged; and (c) by virtue of the thinness and high porosity of the fabric does not greatly reduce the effective cross section of the membrane for ionic conduction. In this way, substrates can be used to inexpensively reinforce or armor thin fluorinated membranes without greatly increasing the low resistance to ionic flow inherent in the unreinforced ion exchange membranes.

The substrate layer may be a continuous sheet or may be a fabric, woven using various weaves, such as the plain weave, basket weave, leno weave, or others. Relatively open weaves are preferred because the electric resistance is lower. The fibers used in the support fabrics may be monofilaments or multifilament yarns. They may be of ordinary round cross sections, or may have specialized cross sections. Oblong or rectangular cross sections, if suitably oriented to the membrane, make it possible to get more reinforcing action with a thinner overall membrane.

In the present invention, the performance of an electrochemical cell such as a fuel cell depends largely on the equivalent weight and thickness of the ion exchange resin layer. The substrate primarily provides the support and reinforcement of the ion exchange resin layer. Thus, the membrane made by the process of the present invention is constituted by an ion exchange layer having a continuous barrier to stop bulk flow of the reactants, and a porous substrate having low electric resistance and high mechanical strength.

In the process for making the membrane, an ion exchange resin layer is integrally laminated to and supported by the substrate layer. The substrate is applied to the continuous fluorinated polymer membrane (preferably in its so-called precursor form) by coating the substrate and/or the surface of the membrane or both with a solvent that will dissolve or disperse some of the polymer precursor at temperatures below the degradation temperature of the substrate. Preferably, the solution or dispersion forms a thin, even layer on the membrane and/or the substrate but does not substantially penetrate the membrane. If the solvent is not uniformly applied then the composite membrane may contain airholes which reduces adhesion between the layers and adversely effects the electrochemical properties of the membrane.

It is also possible to apply a solvent to both sides of the ion exchange resin layer. The solvent should preferably be applied in sufficient amount to dissolve or disperse some of the ion exchange resin on the surface of the layer so as to permit some of the ion exchange resin to penetrate into the pores of the substrate. The substrate may then be overlaid on such surface(s) of the ion exchange resin layer. The surfaces of the substrate and/or the membrane to which the solvent has been applied are then pressed together. Optionally, the layers may be heated and fused together provided that the process is conducted at a temperature below that which would cause the degradation of the fabric. For LHDPE, the lamination process must be performed below about 130° C. Heating of the layers also facilitates the dissolution of resin on the surface of the ion exchange resin layer. The solvent may be removed by vacuum and/or at elevated temperatures. The ion exchange resin layer and the substrate layer are thus integrally bonded.

In addition to such a method, it is possible to form a coating layer in which a solution, suspension or paste of the polymer for forming the ion exchange resin layer (optionally with other resins or plasticizers) is coated on one or both sides of the substrate layer, and the solvent is evaporated or the coating is heated to a temperature higher than the softening point of the polymer.

Compounds useful herein as solvents for the ion exchange resin include, without limitation, lower aliphatic alcohols, such as methanol, ethanol, propanol, isopropanol, perfluorinated cycloalkanes, perfluorinated aromatic compounds and perfluorotrialkylamines.

Perfluorinated cycloalkanes are saturated cyclic compounds, which may contain fused or unfused rings. The cycloalkane compounds may be substituted by perfluoroalkyl and perfluoroalkylene groups. Perfluoroalkylene group is an alkylene group which is branched or linear and connects two different carbocyclic rings. The total number of carbon atoms in all of the perfluoroalkyl and perfluoroalkylene groups in a molecular of the solvent are preferably less than the total number of carbon atoms in the carbocyclic rings of the solvent molecule. It is preferred if there are at least twice as many carbon atoms in the rings of the solvent molecule as there are atoms in the perfluoroalkyl and perfluoroalkylene groups. Perfluorinated aromatic compounds are similar to perfluorocyclic alkanes, provided that one or more of the constituents is a phenyl group. The perfluorinated aromatic compounds may also be substituted with perfluoroalkyl groups or perfluoroalkylene groups. Perfluorotrialkyl amines include, for example, perfluorotrihexyl amine.

In order to ensure that the perfluorinated cycloalkane, perfluorinated aromatic compounds or perfluorotrialkyl amine solvents will actually dissolve the polymer, the critical temperature of the solvent should be preferably about 150° C. or higher, most preferably about 180° C. or higher. Such solvents include, but are not limited to, hexafluorobenzene, perfluoromethylcyclohexane, perfluorodecalin, perfluorotetradecahydrophenanthrene, and perfluorotrihexylamine, preferably perfluorotetradecahydrophenanthrene.

Other suitable solvents are well known and include fluorinated ethers of the FREON ® E series, such as FREON ® E1 and FREON ® E2.

The chemical structure of the FREON ® E series is:

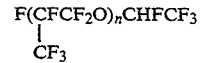

where the E number is equal to n.

British Patent Specification 1,286,859, describes a solution of water with at least 5% by weight of an organic solvent which is suitable for dissolving fluorinated polymers having a low equivalent weight; U.S. Pat. No. 4,453,991 describes a solvent of water or water and an alcohol which dissolves perfluorinated ion exchange polymers at temperatures between 180° C. and 300° C. and below the critical temperature of the liquid components. The solvents described herein are not limiting. Any solvent which partially or fully dissolves the fluorinated ion exchange polymer at temperatures below the temperature that the substrate will degrade are suitable. In addition, the solvent which is applied preferably contains dissolved or suspended ion exchange resin. Preferably, the ion exchange resin is the same resin used to fabricate the ion exchange film.

In any case, in the present invention, any method may be employed for dissolving or dispersing the ion exchange resin so long as it provides a membrane in which an ion exchange resin layer is integrally laminated and supported on one or both sides of the hydrocarbon substrate layer. The total thickness will be preferably from 70 to 350 mm.

The preferred process for the manufacture of a two-layer, fabric-reinforced composite ion exchange membrane involves a series of steps, as follows:

(1) The precursor of the fluorinated polymer is melt extruded to form a film. This precursor polymer may be the sulfonyl fluoride copolymer or the carboxylester copolymer. Both materials may be coextruded to form a bilayer film containing a layer of each polymer;

(2) The precursor film is laminated or bonded to a porous hydrocarbon substrate, preferably a polyolefin fabric such as TYVEK®, MYLAR® or PULPLUS® (all of which are commercially available from E. I. du Pont de Nemours and Company) wherein the solvent is used to facilitate bonding between the fabric and the ion exchange layer. The solvent or a liquid solution of solvent and a fluorinated ion exchange resin is applied, sprayed or coated onto the ion exchange resin layer. The fabric is overlaid onto the surface of the ion exchange resin layer. The solvent is then removed by application of a vacuum.

(3) Optionally, the composite membrane is impregnated with a dilute (e.g., 2%) liquid composition of low equivalent weight ionomer (as disclosed in U.S. Pat. No. 4,453,991), and dried.

(4) The precursor film layer is hydrolyzed to the fluoroionomer form in an aqueous alkaline solution (preferably containing a polar organic solvent such as isopropanol or DMSO), rinsed with water, and dried. In particular, hydrolysis may be performed as described in U.S. Pat. No. 4,584,071; e.g., 50° C.–100° C. solution of 6–20% KOH (preferred) or other soluble hydroxide, 5–40% polar organic solvent (DMSO preferred) and 50–90% water with a contact time of at least 5 minutes. The composite is next rinsed with water for at least 10 minutes resulting in the potassium salt form of the perfluorosulfonate polymer. If desired, the polymer can be exchanged to the desired ionic form by contacting a bath of at least 1% of a salt of the desired cation, or an acid if the hydrogen form is desired, rinsed again with water and dried.

(5) Optionally, the substrate and/or the membrane is impregnated with a solution (preferably 0.2–5%) an ionic surfactant in a water or a water/salt solution and drying.

Each step of the process can be performed on a separate piece of continuously operating equipment with a roll wind-up. However, to prepare a composite involving a very thin continuous ionomeric film layer, and also for economics at high production levels, steps (1) and (2) can be combined. Step (3) could be integrated with step (2) by spraying or otherwise impregnating the membrane as it comes off the laminator (or melt coater) and drying before wind-up.

The three-layer composite may be prepared by following steps (1) and (2) to yield a two-layer laminate and then repeating step (2) in applying a second substrate to the other side of the continuous film layer. It is possible to form a sandwich-like membrane with a layer of substrate sandwiched between two ion exchange resin layers or a layer of ion exchange resin sandwiched between two layers of fabric. Other multilayer variations may also be prepared.

In an alternate embodiment, the precursor ion exchange film may first be hydrolyzed and then laminated or bonded to the porous hydrocarbon substrate.

The ion exchange film can be of fluorinated sulfonyl fluoride polymer, fluorinated carboxylester polymer, or a multilayered structure of such sulfonyl fluoride polymers, carboxylester polymers or both, where the different polymers form distinct layers in the coextruded film. Alternatively, a multilayer film can be made by extruding separate films and "blocking" the films together; i.e., putting the films together under low pressure and heat so that they adhere together through the lamination process.

Also, hydrolysis can be carried out prior to coating the membrane with ionomer if the water content of the hydrolysis bath is low enough so that the bath solution will fully penetrate the membrane, thus preventing delamination from occurring. This would involve hydrolyzing the structure immediately after lamination of the polymer film in a solution of 5–20% alkali metal hydroxide, 30–90% polar organic solvent and 0–60% water, the solution being such that it will enter into the substrate portion of the composite to completely fill the porous structure, at 50° C.–100° C. with a contact time of at least 5 minutes. The structure is rinsed in water and dried. A 1–6% liquid composition of the acid form of the perfluorosulfonic acid polymer in a polar organic solvent is then sprayed or coated onto the fabric side of the structure in the same manner as above. The surfactant, if desired, and salt, if desired, can be applied with the polymer solution.

The substrate layer may optionally be treated to impart a hydrophilic nature to the interior thereof, prior to or subsequent to the bonding with an ion exchange resin layer. Various methods known in the art may be employed as a means to impart the hydrophilic nature to the porous material. For instance, an inorganic hydrophilic nature-imparting agent is incorporated during the formation of the porous material to impart the hydrophilic nature to the material forming the porous layer.

The ion exchange resin layer constituting the membrane of the present invention is made of a fluorine-containing polymer preferably having an ion exchange capacity of from 0.5 to 2.0 meq/g dry resin, most preferably from 0.8 to 1.6 meq/g dry resin, and having preferably carboxylic acid groups, sulfonyl groups or phosphoric acid groups.

The ion exchange resin layer used in this invention is fluorinated, which means that at least 90%, preferably at least 95% and most preferably all of the atoms attached to the carbons are F atoms or side-chain ether groups, which may contain functional groups hydrolyzable to salts. The nonfluorine atoms, if used, may be H, Cl or Br. The following examples of fluorinated sulfonyl and carboxylic acid polymers are not limiting.

The sulfonyl polymers according to this invention may be fluorinated polymers with side chains containing the group $-CF_2CFR'SO_2X$, wherein $R'$ is F, Cl, $CF_2Cl$ or a $C_1$ to $C_{10}$ perfluoroalkyl radical, and X is F or Cl, preferably F. Ordinarily, the side chains will contain $-OCF_2CF_2CF_2SO_2X$ or $-OCF_2CF_2SO_2F$ groups, preferably the latter. The perfluorinated polymers are preferred.

Polymers containing the side chain

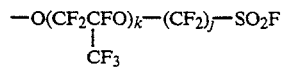

where k of 0 or 1 and j is 2, 3, 4, or 5, may be used.

Preferred polymers contain the side chain —(OCF$_2$-CFY)$_r$—OCF$_2$CFR'SO$_2$X, where R', Y, and X are as defined above; and r is 0, 1, 2, or 3. Especially preferred are copolymers containing the side chain

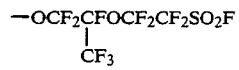

The salt-form carboxylic polymers have a fluorinated hydrocarbon backbone chain to which are attached side chains carrying, before hydrolysis to the salt form, certain function groups hydrolzable in an alkaline medium to carboxylate groups, such as nitrile or ester groups. The polymers include; e.g,. those containing the —(OCF$_2$CFY)$_n$—O—CF$_2$—CF$_2$—W side chains, where Y is F or CF$_3$; n is 0, 1, or 2; and W is COOR or —CN, where R is lower alkyl. Among these polymers, those with n=1 and Y=CF$_3$ are preferred.

Polymerization to form the sulfonyl or carboxylic acid polymers may be carried out by known methods.

The copolymers used in the manufacture of ion exchange resin layers used in the membrane of the present invention should be of high enough molecular weight to produce films which are preferably self-supporting in both their melt-fabricable (precursor) form and in the hydrolyzed ion exchange form.

The equivalent weight of the ion exchange resin is not critical, and depends somewhat on the structure of the salt-containing side chain on each polymer. It may be obtained by using a mole ratio of tetrafluoroethylene to the comonomer in the carboxylate copolymer of 5.0–8.2, preferably 6.0–7.4. In the case where the carboxylate side chains are salts of —OCF$_2$—CF(CF$_3$)—O—CF$_2$—CF$_2$—COOH, the broad equivalent weight of the nonporous layer in contact with the catholyte should be about 908–1230, and the preferred equivalent weight will be about 1008–1150. The equivalent weights are expressed for the —COOCH$_3$ form.

The equivalent weight of the sulfonate polymer is even less critical. In the case where the side chain is the salt of —O—CF$_2$—CF(CF$_3$)—O—CF$_2$—CF$_2$—SO$_3$H, the equivalent weight should be 800–1500, preferably 900–1300, and most preferably 900–1100. The equivalent weight of the sulfonate layer is calculated for the —CO$_3$H form.

The ion exchange resin layer may also be made of a laminated layer or a blended layer comprising two or more fluorine-containing polymers having different ion exchange groups and/or different ion exchange capacities. Namely, by using a combination of at least two types such as a combination of a fluorine-containing polymer having carboxylic acid groups and a fluorine-containing polymer having sulfonic acid groups, or a combination of at least two fluorine-containing polymers of the same type with different ion exchange groups, the respective fluorine-containing polymers may be blended to form an ion exchange resin layer, or the respective fluorine-containing polymers may preliminarily be formed into films, and such films are preferably heated and pressed for lamination to form an ion exchange resin layer. Further, the ion exchange resin layer may also be formed by converting ion exchange groups such as sulfonic acid groups on one side or both sides of a fluorine-containing polymer film into carboxylic acid groups.

The ion exchange resin layer may be of any thickness, but it should be recognized that the thickness may be important in the operation of the present invention. Namely, an ion exchange membrane has low water-permeability, and thus has a higher resistance as compared with a fabric layer. Therefore, the thickness of the ion exchange resin layer is made preferably as small as possible, and usually smaller than the substrate layer. Therefore, the thickness of the ion exchange resin layer is less than about 250 μm, preferably less than 100 μm.

The membrane comprising the porous hydrocarbon substrate layer and the ion exchange resin layer may then be used for facilitated transport processes or chemical separations. It may also be subjected to the above-mentioned treatment for imparting the hydrophilic nature by having at least a portion of its interior pores coated with a perfluoro ion exchange polymer. After imparting the hydrophilic nature to the substrate, the membrane is particularly useful in the fuel cell.

The membrane made according to the present invention provides high power efficiency and low membrane resistance for the generation of electricity in a fuel cell; and by the use of a substrate layer, preferably an LHDPE layer, it provides good mechanical strength, especially tear strength required for the membrane during use in the fuel cell or in its handling. Moreover, the process of making the membrane is simple, reproduce and eliminates the need for a costly heat lamination step.

It is also possible to provide a gas and liquid permeable substrate layer containing electrocatalytically inactive particles or a gas and liquid permeable fabric layer on one or both surfaces of the ion exchange resin layer of the present invention, to further reduce the membrane resistance during operation of the fuel cell.

Initial wetting of the membrane may also be facilitated by treatment of the substrate with a water soluble ionic surfactant such as ammonium perfluorooctanoate.

The generation of electricity in the fuel cell, by means of the membrane of the present invention may be conducted under known conditions. Fuel cells have application as a power source for aerospace devices, unmanned facilities on sea or shore, stationary or movable radios, automobiles or domestic appliances. A plurality of electrochemical fuel cells are often used to provide an economical multistage operation.

The present membrane may also find use in certain electrolysis processes, such as a chloralkali cell, although it should be appreciated that the substrate may deteriorate in the harsh chemical and thermal environment of an electrolytic cell. For example, in electrolysis processes producing caustic exceeding 20% in concentration, a continuous bilayer ion exchange membrane comprising a thin layer of perfluorocarboxylate polymer on one surface of perfluorosulfonate ion exchange polymer film (as described in U.S. Pat. No. 4,487,668) may be incorporated in the composite of this invention with the thin sulfonate layer interfacing with a substrate, such as LHDPE.

Correspondingly, the composites of the present invention can also be used in permeation separation and facilitated transport separation processes and devices. The substrate provides mechanical strength and support and the spaces between the fibers provide avenues for relatively unencumbered passage of fluids to and from the continuous membrane surface without substantially sacrificing the high selective permeation or facilitated transport rates possible with thin perfluoroionomer membranes. Coating the interior and exterior surfaces of the substrate with perfluoroionomer renders the substrate structure sufficiently hydrophilic to avoid gas locking which would block the free passage of aqueous liquids to the membrane surface. In addition, the external and internal coating provides an inert reinforcement of the substrate structure against compression and collapse under a substantial pressure gradient.

The term "substrate" or "fabric" in this disclosure includes, without limitation, substrates and fabrics woven from fibers and also nonwoven webs and sheets of these fibers laid down by a variety of techniques. Within the intent of this disclosure, the term "fabric" also includes polymeric netting, meshes and screens fabricated as one web or by cutting holes in a sheet, in which the intersections between fibers or strength members are completely fused. The substrate layer referred to herein may be a distinct layer or may be integrally bonded to one or more of the other layers.

The term "bond" between substrate and ion exchange resin in this disclosure refers to a union between the fiber or strength member of the substrate with the ion exchange resin, the union being largely, but not necessarily exclusively, mechanical and involving the intermingling of surface components of the ion exchange resin layer with the structure of the substrate. An adhesive material may also effect the bond.

EXAMPLE

Composite ion exchange membranes were prepared by laminating NAFION ® ion exchange films having thicknesses of 1-4 mils to polyolefin substrates. Substrates used were TYVEK ® 1056D, TYVEK ® 980, PULPLUS ® 161 and calendared PULPLUS ® 161. Solutions were made using NAFION ® pellets and perfluorotetradecahydrophenanthrene ($C_{14}F_{24}$) solvent. The solutions were made at 90° C. so as to increase solubility. The solution was applied to the surface of the substrate and the substrate was then laid on the ion exchange film and the layers were laminated at 120° C., 20 in. Hg Vacuum and a laminator speed of 6 in/min.

The membranes were then hydrolzed to the potassium form. A hydrolyzing solution was made that consisted of 10% KOH (weight) in 50/50 methanol and water (volume). The membranes were hydrolyzed at 80° C. for two hours. Spot testing was done with a SEVRON ® stain solution that only satins NAFION ®. The stain showed completed penetration of the NAFION ® in the substrate.

What is claimed is:

1. A process for making a composite membrane comprising:
   a) forming an ion exchange film from a fluorinated polymer;
   b) forming a porous hydrocarbon substrate;
   c) coating at least one side of said film or substrate or both with a solvent for said polymer, said coating being performed at a temperature below the degradation temperature of the substrate and the film; and
   d) pressing together the coated side or sides of the substrate and the film at a temperature below the degradation temperature of the substrate and the film to facilitate bonding of the substrate and the film.

2. The process of claim 1 comprising the further step of heating the membrane and/or applying vacuum to remove the solvent.

3. The process of claim 1 comprising the further step of applying pressure to the membrane to facilitate bonding of the substrate to the film.

4. The process of claim 1 comprising the further step of hydrolyzing of the membrane.

5. The process of claim 1 comprising the further step of impregnating the substrate and/or the membrane with an ionic surfactant.

6. The process of claim 1 wherein the solvent is a lower aliphatic alcohol, a perfluorinated cycloalkane, a perfluorinated aromatic compound or a perfluorotrialkylamine.

7. The process of claim 1 comprising the further step of applying heat to the membrane to facilitate bonding of the substrate to the film.

8. The process of claim 1 in which steps c) and d) of the process are performed at or near room temperature.

9. The process of claim 1 wherein the solvent contains dissolved or dispersed ion exchange polymer.

10. The process of claim 9 wherein the ion exchange polymer used to make the film is the same as the ion exchange polymer dissolved or dispersed in the solvent.

11. A process for making a composite membrane comprising:
   a) forming an ion exchange film from a fluorinated polymer;
   b) hydrolyzing said polymer film;
   c) forming a porous hydrocarbon substrate;
   d) coating at least one side of said hydrolyzed film or substrate or both with a solvent for said polymer, said coating being performed at a temperature below the degradation temperature of the substrate and the film; and
   e) pressing together the coated side or sides of the substrate and the film at a temperature below the degradation temperature of the substrate and the film to facilitate bonding of the substrate and the film.

12. The process of claim 11 comprising the further step of heating the membrane and/or applying vacuum to remove the solvent.

13. The process of claim 11 comprising the further step of applying pressure to the membrane to facilitate bonding of the substrate to the film.

14. The process of claim 11 comprising the further step of impregnating the substrate and/or the membrane with an ionic surfactant.

15. The process of claim 11 wherein the solvent is a lower aliphatic alcohol, a perfluorinated cycloalkane, a perfluorinated aromatic compound or a perfluorotrialkylamine.

16. The process of claim 11 comprising the further step of applying heat to the membrane to facilitate bonding of the substrate to the film.

17. The process of claim 11 in which steps d) and e) of the process are performed at or near room temperature.

18. The process of claim 11 wherein the solvent contains dissolved or dispersed ion exchange polymer.

19. The process of claim 18 wherein the ion exchange polymer used to make the film is the same as the ion exchange polymer dissolved or dispersed in the solvent.

* * * * *